(12) United States Patent
Vakil et al.

(10) Patent No.: US 11,354,010 B2
(45) Date of Patent: Jun. 7, 2022

(54) ENTERPRISE WORKSPACE NOTIFICATIONS SERVICE

(71) Applicant: VMWARE, INC., Palo Alto, CA (US)

(72) Inventors: Ashka Vakil, Palo Alto, CA (US); Sean Walbran, Palo Alto, CA (US); Dan Dockery, Palo Alto, CA (US); Lilit Div, Palo Alto, CA (US); Aditya Ulman, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 70 days.

(21) Appl. No.: 16/842,807

(22) Filed: Apr. 8, 2020

(65) Prior Publication Data
US 2021/0124463 A1  Apr. 29, 2021

Related U.S. Application Data

(60) Provisional application No. 62/925,607, filed on Oct. 24, 2019.

(30) Foreign Application Priority Data

Jan. 15, 2020  (IN) .............................. 202044001766

(51) Int. Cl.
G06F 3/0481  (2022.01)
G06F 9/451  (2018.01)

(52) U.S. Cl.
CPC .................................. *G06F 3/0481* (2013.01)

(58) Field of Classification Search
None
See application file for complete search history.

(56) References Cited

U.S. PATENT DOCUMENTS

| 8,126,970 | B2 | 2/2012 | Fernandes | |
|---|---|---|---|---|
| 8,707,201 | B1* | 4/2014 | Aradhye | H04L 51/26 715/789 |
| 8,798,259 | B2 | 8/2014 | Kim | |
| 10,158,734 | B2 | 12/2018 | Brune | |
| 10,275,411 | B2 | 4/2019 | Kura | |
| 10,601,457 | B2 | 3/2020 | Gilson | |
| 2016/0028677 | A1* | 1/2016 | Narasimhan | H04L 67/16 709/203 |
| 2016/0253089 | A1* | 9/2016 | Lee | G06F 3/0488 345/173 |
| 2016/0357574 | A1* | 12/2016 | Chen | G06F 9/44536 |
| 2017/0093766 | A1 | 3/2017 | Nagaralu | |
| 2020/0387411 | A1* | 12/2020 | Chu | G06F 16/5866 |
| 2021/0019108 | A1* | 1/2021 | Smith | H04R 1/1041 |

\* cited by examiner

*Primary Examiner* — Matthew Ell
*Assistant Examiner* — Samuel Shen
(74) *Attorney, Agent, or Firm* — Clayton, McKay & Bailey PC

(57) ABSTRACT

A notification builder implemented through a graphical user interface ("GUI") provides a platform for building notifications and defining priorities for how the notifications will be presented to users of managed devices. Elements included in the notification builder and selectable as part of a build process can provide options for naming a notification, providing content for the notification, defining recipients, setting a respective priority, and creating action buttons. An action button can allow a user that has received a notification built with the notification builder to interact with the notification in a predetermined manner. The GUI can also provide data relating to the notification, such as success/failure, read/unread, etc.

17 Claims, 14 Drawing Sheets

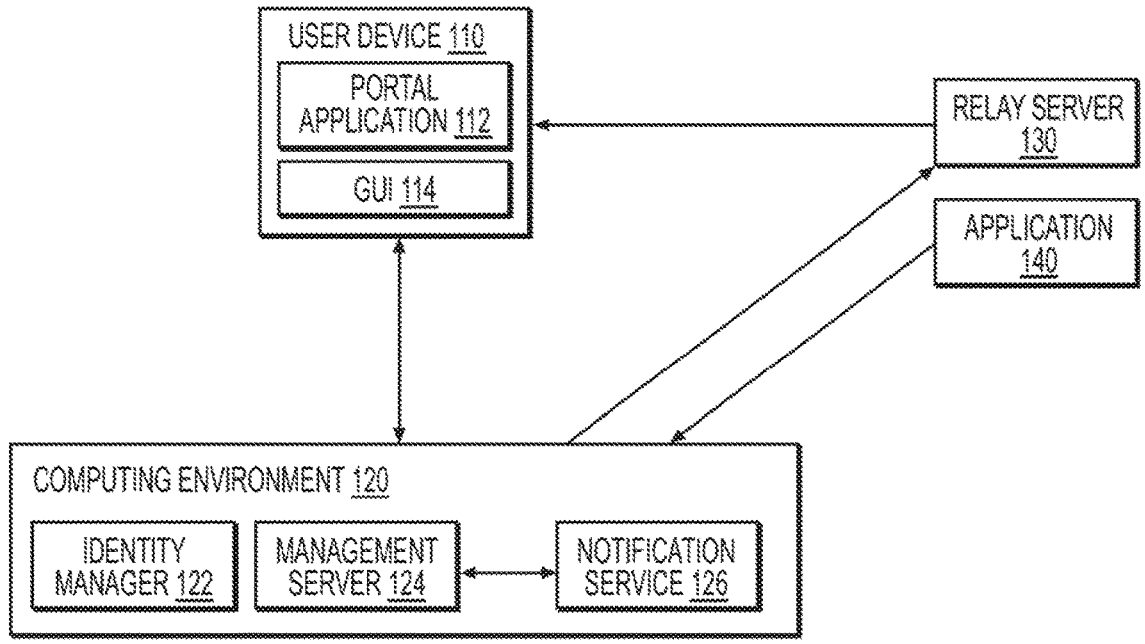
FIG. 1
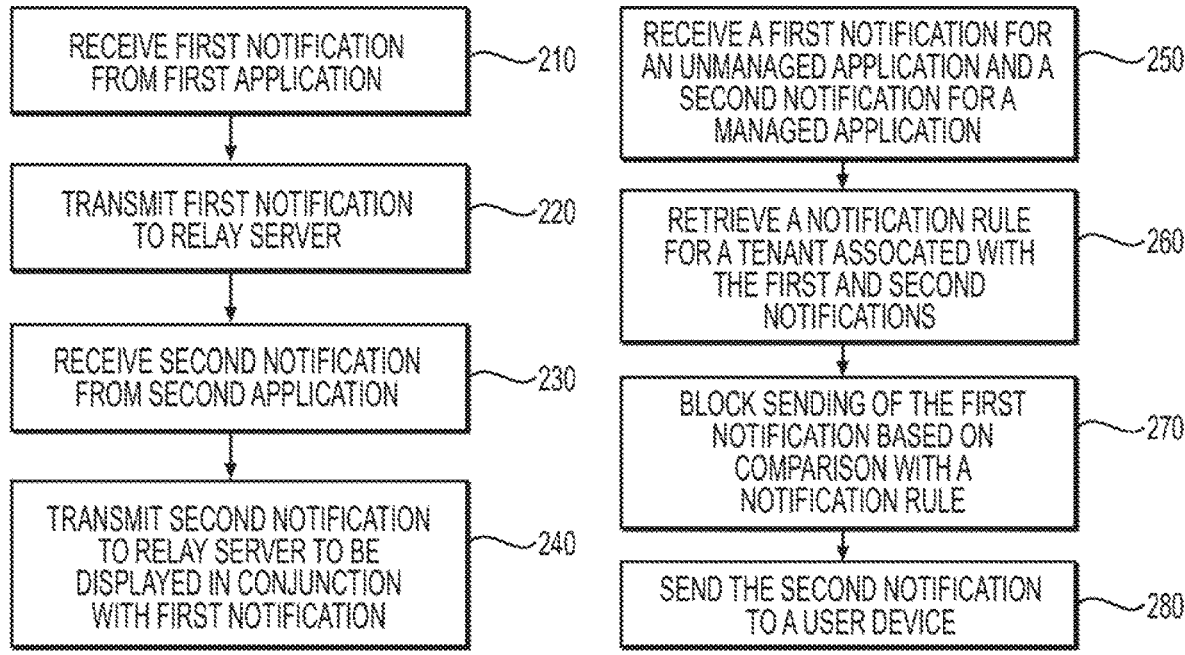
FIG. 2A  FIG. 2B

| CUSTOM NOTIFICATION | DETERMINE THE CONTENT AND ACTIONS TO INCLUDE IN THIS NOTIFICATION — 940 |
|---|---|
| 1 DEFINITION | TEMPLATE [INFORMATIONAL ▼]   PREVIEW — 1050 |
| 2 CONTENT | CONTENT |
| 3 SUMMARY | IMAGE [_____] |

TEMPLATE [INFORMATIONAL ▼]

THE DEFAULT IMAGE WILL BE USED IF THE IMAGE URL IS NOT SPECIFIED OR THE IMAGE CANNOT BE FETCHED WHEN THE NOTIFICATION IS SENT OUT.

TITLE * [UPCOMING SYSTEM DOWNTIME] — 1010

SUBTITLE [COMING THIS SUNDAY] — 1020

— 1030

DESCRIPTION * [_____] — 1040

Preview box:
⬡ UPCOMING SYSTEM DOWNTIME
COMING THIS SUNDAY
DESCRIPTION GOES HERE
[MARK AS READ]

[CANCEL] [BACK] [NEXT]

| CUSTOM NOTIFICATION | DEFINITION | | CONTENT NOTIFICATION CARD PREVIEW — 1110 |
|---|---|---|---|
| 1 DEFINITION | NAME | TEST | |
| 2 CONTENT | TARGET AUDIENCE | USER GROUP | |
| 3 SUMMARY | TYPE | | |
| | AUDIENCE | A6M3U@HS.TRCINT.COM | |
| | PRIORITY | STANDARD | |

Preview box:
⬡ UPCOMING SYSTEM DOWNTIME
COMING THIS SUNDAY
UPCOMING SYSTEM DOWNTIME
[MARK AS READ]

[CANCEL] [BACK] [CREATE] — 1120

FIG. 11

ENTERPRISE WORKSPACE NOTIFICATIONS SERVICE

RELATED APPLICATIONS

Benefit is claimed under 35 U.S.C. 119(a)-(d) to Foreign application Serial No. 202044001766 filed in India entitled "ENTERPRISE WORKSPACE NOTIFICATIONS SERVICE", on Jan. 15, 2020, by VMware, Inc., which is herein incorporated in its entirety by reference for all purposes.

The present application is related in subject matter to U.S. patent application Ser. No. 16/842,764, which is incorporated herein by reference.

CROSS REFERENCE TO RELATED APPLICATION

This application claims priority to provisional patent application No. 62/925,607 ("Enterprise Workspace Notifications Service"), filed Oct. 24, 2019, which is incorporated by reference in its entirety.

BACKGROUND

Enterprises use enterprise mobility management ("EMM") systems to manage which applications can access work files and how those applications operate on enterprise-owned, or otherwise EMM system-enrolled, devices utilized by enterprise members ("users"). However, these applications can use different services for receiving and transmitting notifications. Often, the services employed for those purposes are not under the control of an EMM system. Further, the EMM system cannot assume availability of a notification push platform. As a result, this can place notifications outside of the enterprise's management and control, and add to uncertainty regarding whether the proper notifications are reaching users.

For similar reasons, enterprises have very little flexibility over which notifications are sent to users. It is therefore common for enterprises to be limited to using pre-defined notifications that are native to particular applications, despite their ineffectiveness relative to other types of notification that would be beneficial to the enterprise.

Users are also inundated by notifications from various applications. To compound this issue, enterprises have little control over which notifications take precedence. In fact, enterprises may not even know which personal applications a user has installed on their user device. These other applications can issue any number of notifications that cause notifications from managed enterprise applications to get overlooked or buried.

Therefore, a need exists for a notification platform that can be managed by an enterprise.

SUMMARY

Examples described herein include systems and methods for a notifications platform that can be managed in an EMM system. A notifications service can execute and receive notifications from external unmanaged applications and internal managed applications. The notifications can be stored and prioritized in an example. An administrative console can allow an administrator to whitelist or blacklist different types of notifications and control which types of notifications are presented to users. The lists can be tenant specific. In one example, the lists can be used to prioritize notifications. For example, notifications having a minimum priority threshold that are for a managed enterprise application can be displayed above notifications for an unmanaged application. The console can give administrators control over which notifications, managed or unmanaged, are prioritized for display to users.

In one example, the notifications can include a tenant identifier and a user identifier. The tenant identifier can allow a management server to retrieve tenant-specific preferences (e.g., blacklists) for how notifications are prioritized and displayed on a user device. The user identifier can identify which user for that tenant will receive the notification. A load balancer can create additional instances of the notification service as workload demands.

In some examples, a notification builder tool can be provided in a graphical user interface ("GUI"). The notification builder tool can be part of an administrative console that includes options for creating notifications and managing which notifications are sent to users. The notification builder tool can include options for creating notifications, including a definition option and a content creation option, for example. The definition option can define parameters of a notification. For example, the definition option can include options for naming a notification, selecting recipients of the notification, and selecting a priority of the notification. The content creation option can include options for building the notification from a predefined or a custom template, as well as fields for providing the content to be displayed in the notification. The content creation option can also include a preview window that displays how the notification will appear. The preview window can be updated in real-time as the notification content is created.

In one example, a content creation option can also include an action button creation tool. The action button creation tool can allow a user, such as an administrator in an enterprise organization, to create an action button that can be included in a notification. The action button creation tool can, as an example, provide fields for text to be displayed on the button before and after the button is interacted with by a user. The behavior type of the action button can also be included. Examples of behavior types can include "Open In", application programming interface ("API"), and "API with Parameters." In an example, "Open In" can direct the user to a web page upon the user's selection of the action button, "API" initiates an API call based on default configurations when a user interacts with the action button, and "API with Parameters" initiates an API call when a user interacts with the action button according to additional custom parameters defined by the administrator. The GUI can also provide options to select a method and API endpoint. In an example, the GUI can provide an option to make the action repeatable. In another example, the GUI can provide an option to place the action button in a different position in the notification than the predefined position.

Creating a notification can cause the notification to be sent to selected user devices. A GUI can include a dashboard page that allows an administrator to view the status of created notifications. The GUI can also provide information relating to which selected users have viewed or interacted with the notification.

In some examples, a console can include options for prioritizing both custom and non-custom notifications. An administrator can set a priority level of notification types. An API can include a code representing priority with a notification when it is sent to a user device. The user device can then prioritize a display of the notification accordingly. In one example, a highest priority level application can require a user to respond to the notification prior to lower level notifications being displayed. This can ensure important work-related notifications are dealt with prior to notifications for unmanaged applications.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 1 is an example illustration of system components for a notification service.

FIG. 2A is a flowchart of an example method implemented by an exemplary notification service for managing notifications of managed and unmanaged applications.

FIG. 2B is a flowchart of an example method implemented by an exemplary notification service for managing notifications of managed and unmanaged applications.

FIG. 7 illustrates an exemplary GUI component for providing a notification builder.

FIG. 8 illustrates an exemplary GUI component for providing a notification builder.

FIG. 10 illustrates an exemplary GUI component for providing a notification builder.

FIG. 11 illustrates an exemplary GUI component for providing a notification builder.

DESCRIPTION OF THE EXAMPLES

Figure 3:
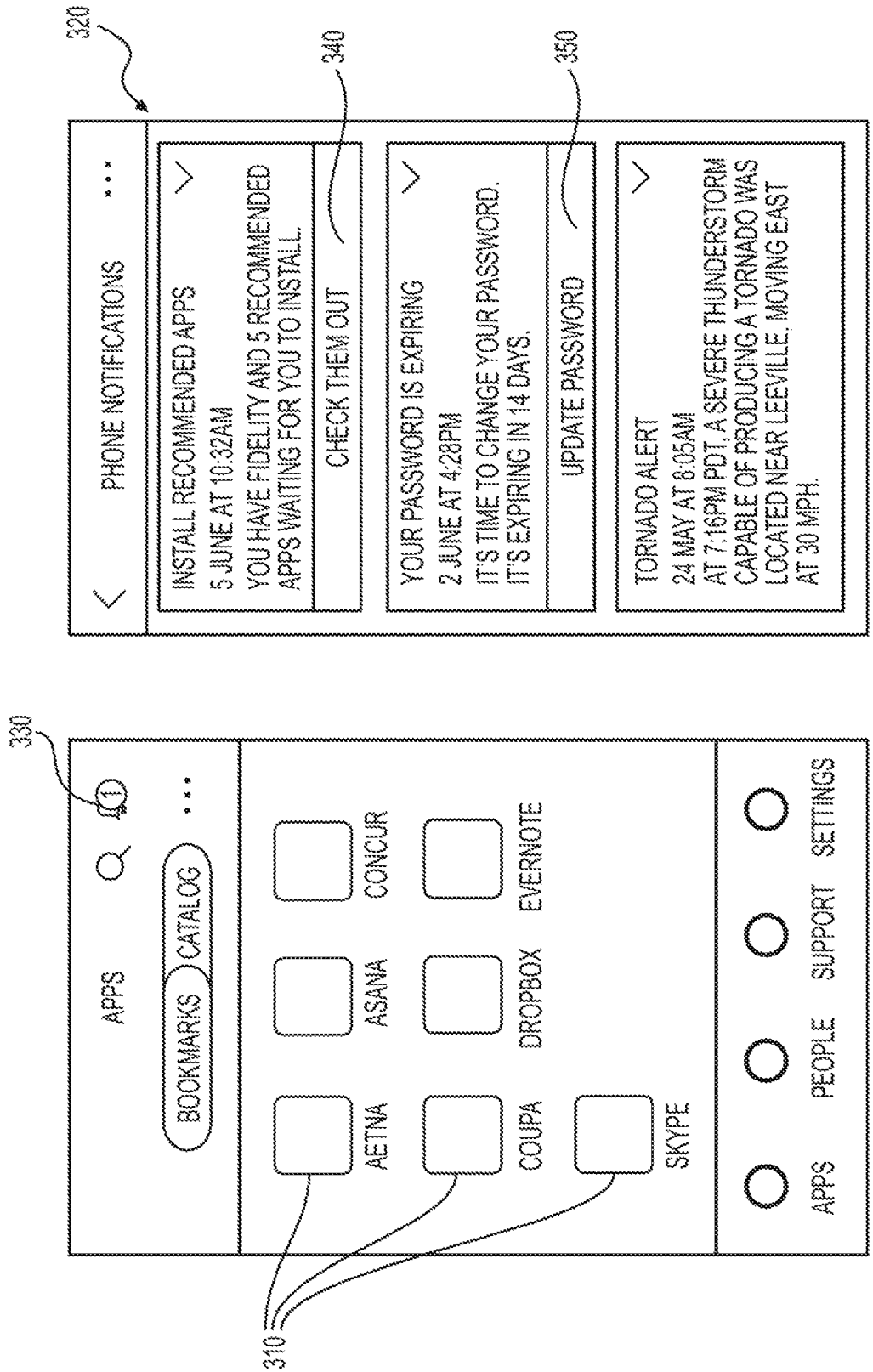
FIG. 3 is an illustration of an exemplary GUI for providing a notification service.

Reference will now be made in detail to the present examples, including examples illustrated in the accompanying drawings. Wherever possible, the same reference numbers will be used throughout the drawings to refer to the same or like parts.

FIG. 1 depicts an example system in which a notification service can be implemented. The system can include a user device 110, a computing environment 120, a push relay server 130, and an application 140. The user device 110 can be one or more processor-based devices, such as a personal computer, tablet, or cell phone. The user device 110 can include a portal application 112. The portal application 112 can be, as an example, an application that provides varying levels of access to multiple other applications that may or may not be installed on the user device 110. The portal application 112 can store a user's credentials and provide access to enterprise applications by authenticating the user to various applications. For example, the portal application 112 can utilize single sign-on ("SSO") services to provide access to applications such as the application 140.

The portal application 112 can include, or provide instructions to display, a graphical user interface ("GUI") 114. The GUI 114 can be configured to allow a user to interact with the computing environment 120. For example, the GUI 114 can include icons and buttons that grant access to various applications 140 and resources of the computing environment 120. The GUI 112 can also display notifications for the applications 140 associated with the computing environment 120.

The computing environment 120 can be a group of servers and databases that coordinate with each other to provide a specific set of services to users. For example, the computing environment 120 can be an EMM system that manages which applications on user devices can access work files, and how those applications operate. The computing environment 120 can include an identity manager 122, a management server 124, and a notification service 126. Each of the identity manager 122, management server 124, and notification service 126 can be provided by a respective server within the computing environment 120, each server capable of providing specific services to user devices. In some examples, the functions performed by the identity manager 122, management server 124, and notifications service 126 can be executed by the same server instead of multiple servers.

The identity manager 122 can manage the security and authentication of user devices including the user device 110, and file transfers for the computing environment 120. For example, the identity manager 122 can manage system-to-system authentication for notification service outbound API calls to a backend application or a catalog service, such as application 140.

The management server 124 can be configured to manage the operation of user devices that interact with the computing environment 120. For example, the management server 124 can manage user device access to enterprise resources, such as the application 140. The management server 124 can manage user devices by providing instructions to the portal application 112, as an example. The management server 124 can interact with the notification service 126 to manage the distribution of notifications to user devices.

The notification service 126 can manage notifications from multiple sources that are directed to a particular user profile. In addition, the notification service 126 can store and maintain all required notification data for the computing environment 120. Such data can include a tenant identifier, a user identifier, a record identifier, create/update timestamps, a read/unread notification state, a body of a notification, and other categories as deemed necessary.

The notification service 126 can include an API. The API may support RESTful or CRUD architecture for notification records. The API can include a creator (create new notifications for user and update notification body) and user (mark read/unread, delete, etc.). The API can also include real-time notification pushes to, for example, mobile applications (via push notification relay server) or web applications (web-sockets).

The notification service 126 can store notifications for multiple applications including the application 140, both managed and unmanaged, in a repository that is accessed by notification service instances. In one example, the notification service 126 can send the notifications that are not blacklisted for the tenant. This can include retrieving tenant-specific notification rules, such as blacklists, based on a tenant ID of a notification and checking a user profile associated with a user ID for the notification. User profiles can allow for different blacklists or whitelists to be applied to different users in a single enterprise (for a single tenant).

The notification service 126 can also manage how the notifications are displayed in the GUI 114. For example, the notification service 126 can compile notification data from multiple sources and cause them to be displayed in one location in the GUI 114. The notification service 126 can provide such display instructions to the portal application 112, as an example. In addition, the notification service 126 can also cause the GUI 114 to sort the notifications based on priority and remove dismissed notifications.

The notification service 126 can include an authentication process. Authentication can include system-to-system authentication for notification service outbound API calls to the application 140 or the management server 124. Authentication can utilize JWT OAuth tokens for creators of new notification records, as an example. Authentication can also utilize JWT OAuth User authentication for updating a read/unread status or deleting notification records. The application service 140 can use existing access tokens as bearer or cookie authentication. In some examples, notification record action Uniform Resource Locators ("URLs") can be absolute for external services (no proxying of remote actions). In some examples, user authentication for notification actions may not be managed by the notification service 126. Some example notification actions can include directing a user to a web page or making an API call. Notification actions are described in further detail later herein regarding FIGS. 9-15.

A relay server 130 of the example system of FIG. 1 can be any server used for pushing notifications to user devices. The relay server 130 can initiate a data exchange request with a user device, such as the user device 110, as opposed to more traditional methods where the user device initiates the request. The relay server 130 can be configured to receive notifications from the notification service 126 and "push" them to the user device 110.

The application 140 can include one or more applications for which a user has access to through the computing environment 120. Access to the application 140 can be managed by the management server 124. The application 140 can provide notifications for the user device 110. Examples for the application 140 can include email, word processing, calendar, and messaging applications.

FIG. 2A illustrates an example method that may be implemented within the system of FIG. 1. At stage 210, a computing device can receive a first notification from a first application (such as the application 140 and hereafter referred to as "the first application 140"), in one example. In another example, a server (such as the management server 124 and hereafter referred to as "the management server 124") can receive the first notification from the first application 140. In another example, a service (such as the notification service 126 and hereafter referred to as "the notification service 126") can receive the first notification. The notification service 126 can receive the first notification directly from the first application 140 in one example, and in another example, the notification service 126 can receive the first notification from management server 124.

At stage 220, a computing device can transmit the first notification to a user device (such as the user device 110 and hereafter referred to as "the user device 110"). For example, the notification service 126 can transmit the notification to the user device 110. When the user device 110 has an active session open with a computing environment (such as the computing environment 120 and hereafter referred to as "the computing environment 120"), the first notification can be transmitted as data files directly to the user device 110 using an API call, for example. The data files can be XML or JSON files, for example. This can also be done using a dedicated interface with the device 110. In some examples, the notification can be pushed to the user device 110 through a server (such as the relay server 130 and hereafter referred to as "the relay server 130"). For example, the notification service 126 can send a push notification data file to the relay server 130, and the relay server 130 in turn pushes the first notification to user device 110 regardless of whether user device 110 has an active session with computing environment 120.

Transmitting the first notification to the user device 110 can cause the first notification to appear in a dedicated notifications window of the GUI 114. The notification service 126 can manage notifications that appear in the GUI 114. For example, the notification service 126 can compile notifications data from multiple sources and cause them to be displayed in one location in the GUI 114. The notification service 126 can also manage how the notifications are displayed. For example, the notification service 126 can order the notifications based on priority, and remove dismissed notifications from a GUI window of the GUI 114.

At stage 230, the computing device can receive a second notification from a second application (hereafter referred to as "second application 140"). For example, the notification service 126 can receive the second notification from the second application 140. In another example, the management server 124 can receive the second notification first and relay the second notification to the notification service 126.

At stage 240, the computing device can transmit the second notification to the user device 110 to be displayed in conjunction with the first notification Like in stage 220, the notification service 126 can transmit the second notification to the user device 110. The second notification can also be transmitted to the user device 110 via the relay server 130 for push notifications.

The notification service 126 can determine how the second notification should be displayed in the GUI 114. The notification service 126 can provide instructions to the GUI 114 to display the first and second notifications in conjunction. For example, priority data or some type of designation can be derived from the first and second notifications and processed by the notification service 126 prior to their display. In one example, the notification service 126 can compare the priority of the two notifications and instruct the GUI 114 to display the notification with the higher priority above the notification with the lower priority. Parameters for how the notifications are displayed together in the GUI 114 can be set by an administrator, for example.

FIG. 2B is a flowchart of an example method implemented by an exemplary notification service for managing notifications of managed and unmanaged applications. At stage 250, the notification service 126 can receive first and second notifications for unmanaged and managed applications, respectively. The unmanaged application can be outside of the computing environment 120 ecosystem. The managed application can be within the computing environment 120 ecosystem and use an API of the notification service 126 in sending the second notification. The notifications can be directed to the notification service 126, which can store the notifications in a repository. In one example, multiple instances of the notification service 126 are managed by a load balancer. Each instance can access the repository, or different repositories and instances can be assigned to different tenants. In one example, the different instances of the notification server 126, as well as the repositories, can be incorporated in an enterprise-managed computing system and in communication through a network, for example the internet, through an enterprise managed cloud computing service, or an internal network (e.g., an intranet).

At stage 260, the notification service 126 can retrieve a notification rule, such as a blacklist, for a tenant identifier associated with the first and second notifications. A tenant identifier can be a set of numeric or alphanumeric characters associated with a tenant. The tenant can indicate an organization or group within one or more enterprises that use the management server 124. In an example, the tenant identifier can be assigned to the user device 110 by the management server 124 as part of an enrollment process. The tenant identifier can be stored in a repository accessible by the notification service 126, and the notification rule can be mapped to the tenant identifier. In an example, notifications received in stage 250 can include a tenant identifier associated with the notification. The notification service 126 can use the tenant identifier to retrieve any notification rules associated with the tenant identifier. The notification service 126 can then check the notification against notification rules associated with the provided tenant identifier.

Alternatively, a user identifier can be used to determine the tenant based on the user's association with that tenant. A user identifier can be a set of numeric or alphanumeric characters that identifies a specific user profile that uses management server 124. The user identifier can be mapped to one or more tenant identifiers of tenants to which the user profile is a part. In an example, a notification received by the notification service 126 can include a user identifier. The notification service 126 can use the user identifier to identify any associated tenant identifier, and then use the tenant identifier to identify any notification rules to be applied. In another example, a user identifier can also map directly to notification rules, and the notification service 126 can retrieve any applicable notification rules associated with the user identifier. In another example, the notification service 126 can retrieve notification rules associated with the user identifier and any tenant identifiers to which the user identifier is associated.

The way in which each tenant handles notifications can be defined at an administrative console. For example, an administrator can define which types of notifications are allowed, disallowed, prioritized, or deprioritized. Such selections can result in one or more notification rules that the notification service 126 can use to determine which notifications to send.

The notification rule can exclude certain notification types from being delivered. For example, the notification rule can prioritize sending notifications for managed applications over unmanaged applications. This can include applying different priority thresholds to the notifications based on the management status of the associated application. Some examples of priority levels can include "Standard," "High-Priority," and "Urgent." Standard notifications can include information notifications such as approvals, maintenance, notices, and organizational updates that do not require a timely response or no response at all. High-Priority notifications can include time sensitive notifications such as password expiration updates, required security training and legal notices that require attention and a timely response. Urgent notifications can include extremely urgent notifications that proactively alert users about important updates such as severe weather alerts, emergencies, and compromised devices that require an immediate response. In an example of applying a priority threshold, the first notification for an unmanaged application may need a priority level above Standard to be sent, whereas the second notification for a managed application may be sent regardless of priority. Notification priority levels can be set by an administrative user or device, such as the management server 124 or the notification service 126.

The notification rule can also include a blacklist. This can specifically list applications whose notifications will be disabled or deprioritized.

The notification rule can include compliance requirements. In one example, delivering the notification can depend on whether a device (that is a target destination of a notification) complies with one or more compliance rules. The way in which compliance checks are handled can be defined at an administrative console. For example, if a target device is out of compliance, an administrator can configure what notifications the target device can receive. In one example, the configuration can block all notifications for user-subscribed and/or admin-configured notification services when the user device is noncompliant. In another example, the non-compliant user device can only receive high priority notifications from user-subscribed and/or admin-configured notifications services. In another example, the notification rule can cause a non-compliance notification to be generated and take priority over all or certain notifications having an assigned priority level that is at or lower than a particular priority level. Accordingly, the non-compliance notification can serve as a notice to the user that all enterprise-related notifications, and other notification types, are being purposely held because the user's device is not up to date with certain protocols.

Device compliance can be based on, for example, the state of the target device or the context around a use of the target device. Some examples of checking the state of the target device can include verifying that certain applications are/are not installed, checking the OS version, determining the last instance where the target device checked-in with a management server, checking policies enforced on the device, and checking the target device's network access to particular networks. For example, a compliance rule can require that a management agent (e.g., an application such as portal application 112) must remain installed on an enrolled device. If the management agent is uninstalled or disabled, the device can be limited in notifications it can receive.

Some examples of checking the context around use of the target device can include determining the geo-location of the device and the time of day at the geo-location of the device. For example, the administrator can set a policy disallowing device usage outside of business locations for an enterprise outside business hours. Any devices located outside all or specified business locations can be blocked from receiving certain notifications during or outside of business hours, in an example.

Compliance can be checked based on the user device executing a management agent, which can be a standalone process or part of the operating system. The agent can determine whether the device complies with various requirements that can be part of a user profile, such as the examples provided above. Different users can have different compliance criteria. In addition to the checks mentioned above, a compliance check can determine if an OS of a device is jailbroken, if encryption settings are in place, or if there is an absence of certain programs that are required to be absent for compliance.

At stage 270, based on comparison with the notification rule, the notification service 126 can block sending of the first notification. Again, compliance-based blocking can include (1) blocking any notifications for user-subscribed notification services, (2) only allowing high priority notifications from user-subscribed notifications services, (3) blocking any notifications for admin-configured notification services, and (4) only allowing high priority notifications for admin-configured notification services, among other configurations.

At stage 280, the notification service 126 can send the second notification to the user device 110. The notification can include priority data that impacts how the notification is displayed on the user device 110. In one example, this can include displaying the second notification above a third notification generated by an unmanaged application. The notifications can be displayed in a common window in one example. A user can be locked into resolving a highest priority notification before a lower priority notification will display, in an example.

FIG. 3 is an illustration of an exemplary GUI for providing a notification service. According to an aspect of the present disclosure, the exemplary GUI of FIG. 3 represents an example of the GUI 114 for the system of FIG. 1 and will be referred to as the same. Further, the GUI 114 can be implemented by an application management software solution that embodies, for example, the portal application 112. Further, the above application management software solution can implement the methods of FIGS. 2A and 2B.

The GUI 114 includes application icons 310 that can connect to applications such as the application 140, and can include applications such as Aetna®, Evernote®, and Skype®, that are connected to the GUI 114. The notification service 126 discussed herein can receive notifications from one or more of the applications represented in FIG. 3. The notification service 126 can transmit notifications to the relay server 130, which can in turn relay the notifications to the user device 110 where they can appear in a central notifications window 320. The GUI 114 can include a notification icon (bell) 330 with a number to indicate to a user how many of the received notifications are still unread. Selecting the notification icon 330 can cause the notification window 320 to be displayed in the GUI 114. The notification window 320 can provide the user with options for interacting with the notification, such as "Check them out" element 340 and "Update Password" element 350.

Figure 4:
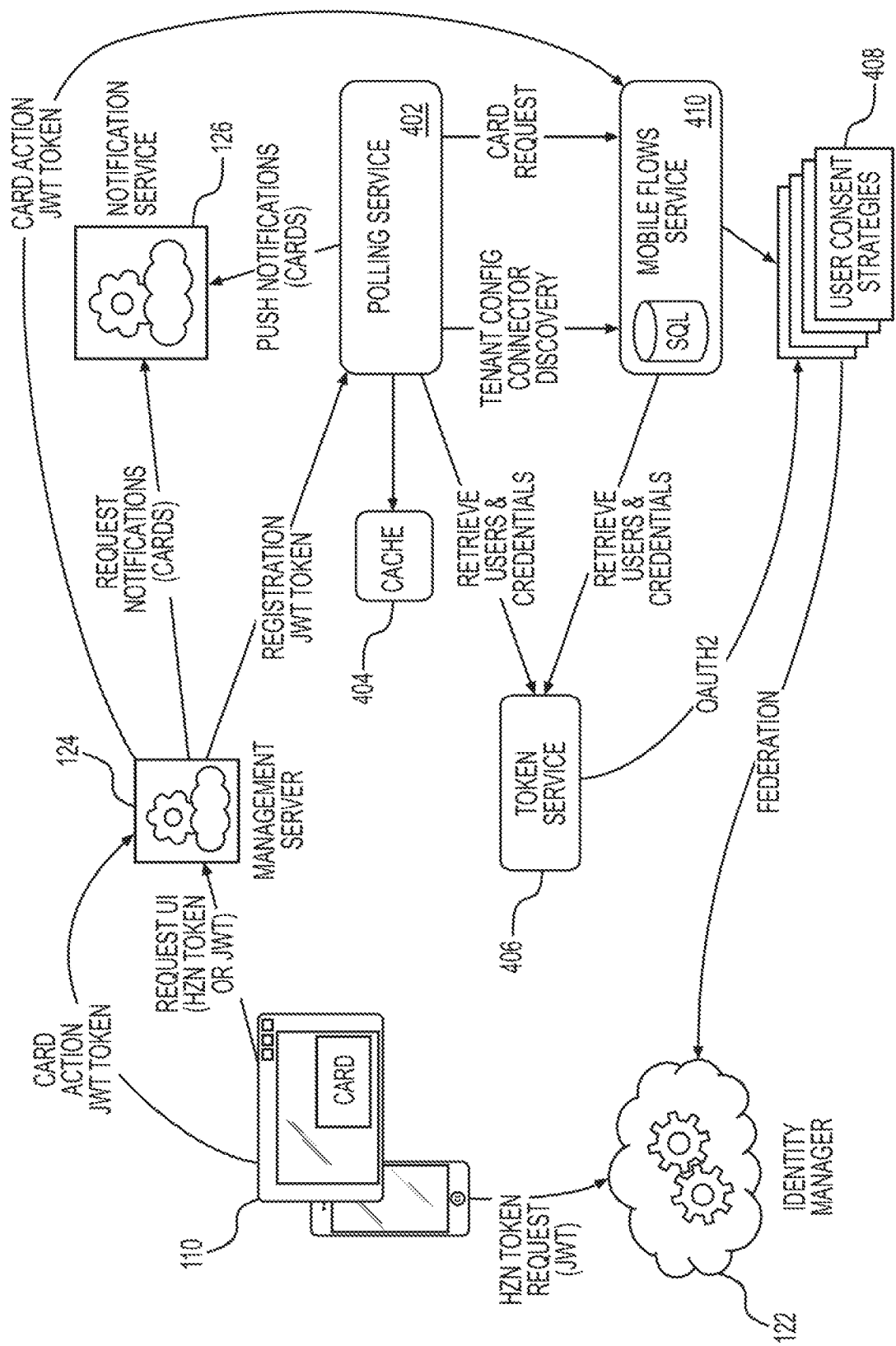
FIG. 4 illustrates example system components that can operate to provide exemplary implementations of a notification system.

FIG. 4 illustrates example system components that can operate to provide exemplary implementations of a notification system. In particular, FIG. 4 illustrates an exemplary backend configured to implement a notification system as described with reference to FIGS. 1-3. A backend according to the present disclosure can include a polling service 402 that communicates with applications such as the application 140 for the system of FIG. 1, to establish notification exchange(s). Cache 404 can be implemented to determine whether notifications are new. A token service 406 can be utilized to refresh authentication. The backend can incorporate user consent strategies 408, such as access tokens, refresh tokens, and credential submission. In some examples, users can elect to subscribe to notifications. In some examples, some notifications for users can be subscribed to by an administrator for the user. The cache 404 can keep credentials that are used to refresh the logins. Some examples can include a white-listing functionality where administrators can, for example, prevent a user from unsubscribing from a notification.

User flows can dictate which notifications are issued to particular applications based on conditions in associated backend systems. The backend system can define connectors that allow for API calls to the various backend systems to retrieve objects or other information. In some examples, a mobile flows service 410 can generate regular expressions to be used for searching the backend systems. When defined conditions exist in the backend systems, the mobile flows service 410 can generate a notification. The conditions can be defined for particular business events that may be important to the enterprise. The notification can be sent to the notification service 126.

Figure 5:
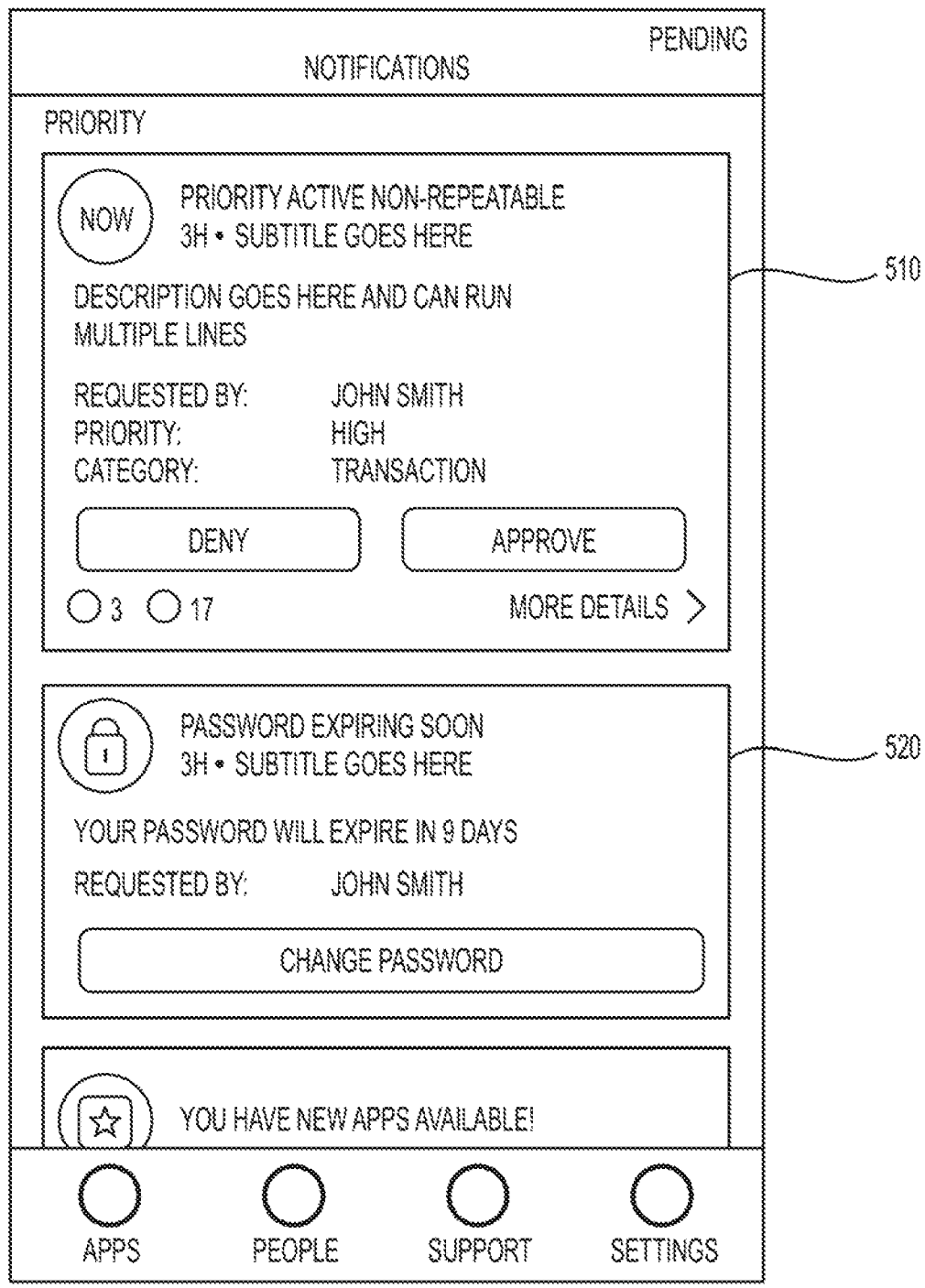
FIG. 5 illustrates an exemplary GUI component for displaying a notification priority.

FIG. 5 illustrates an exemplary GUI component that can be implemented by the notification service 126 for displaying a notification priority. Notifications 510 and 520 can be presented in the GUI 114 in order of priority. Ordering notifications by priority can be an option a user can select. In some examples, high priority notifications can be displayed over the GUI 114 so that they cannot be ignored. The notification system 126 can require that the user interact with the notification before re-accessing the GUI 114. The notification priority can be defined by an administrator. The notification system 126 can require a user to act on a notification before removing it from the GUI.

The notification system 126 can include a notification builder. The notification builder can include a set of user interface ("UI") flows that allow an administrator to create a notification, select an audience (device type, office location, etc.), build a notification, wire up actions, check notification success, etc. FIGS. 6-15 illustrate exemplary GUI components for accessing and providing a notification builder.

Figure 6:
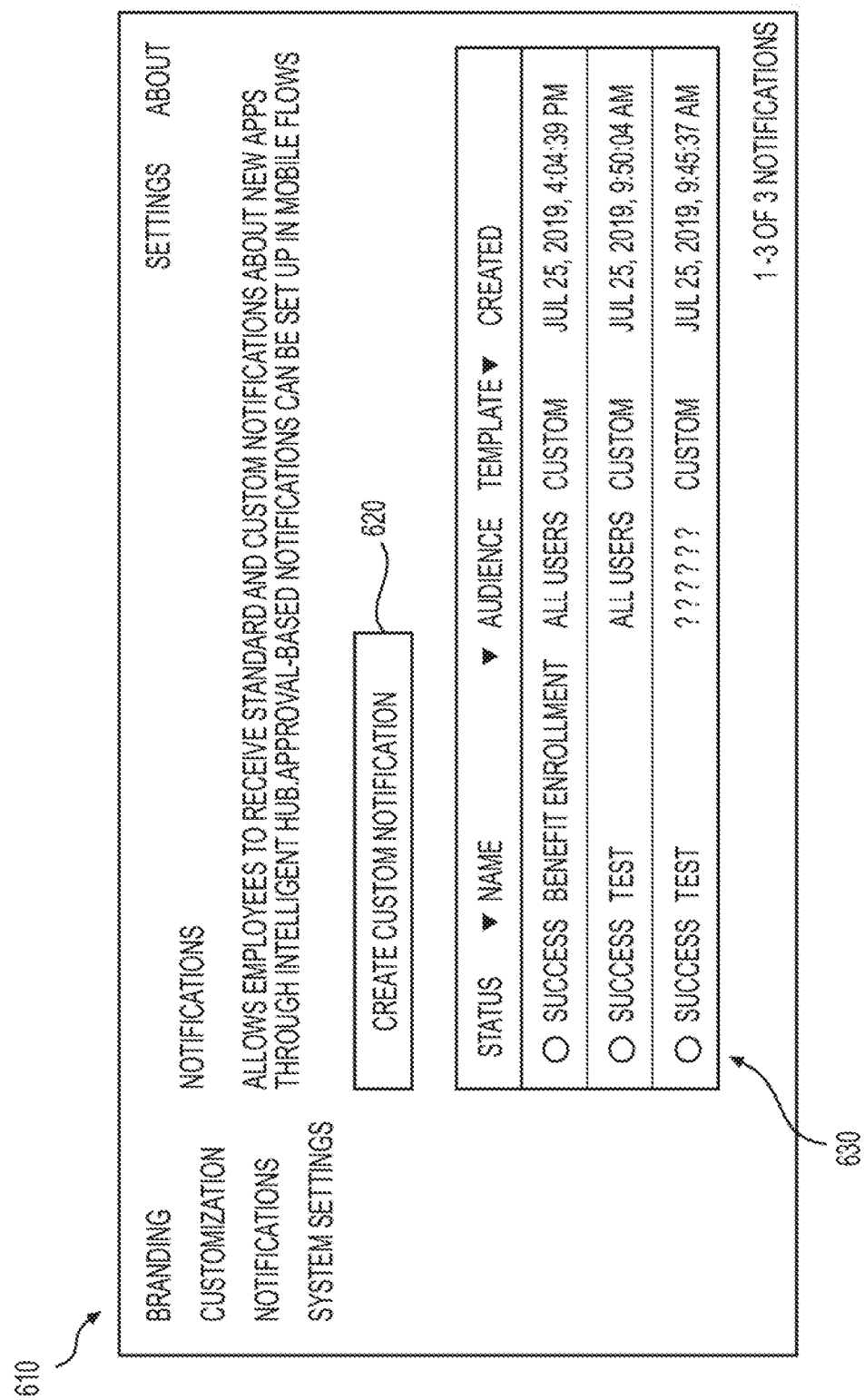
FIG. 6 illustrates an exemplary GUI component for accessing a notification builder.
Figure 7:
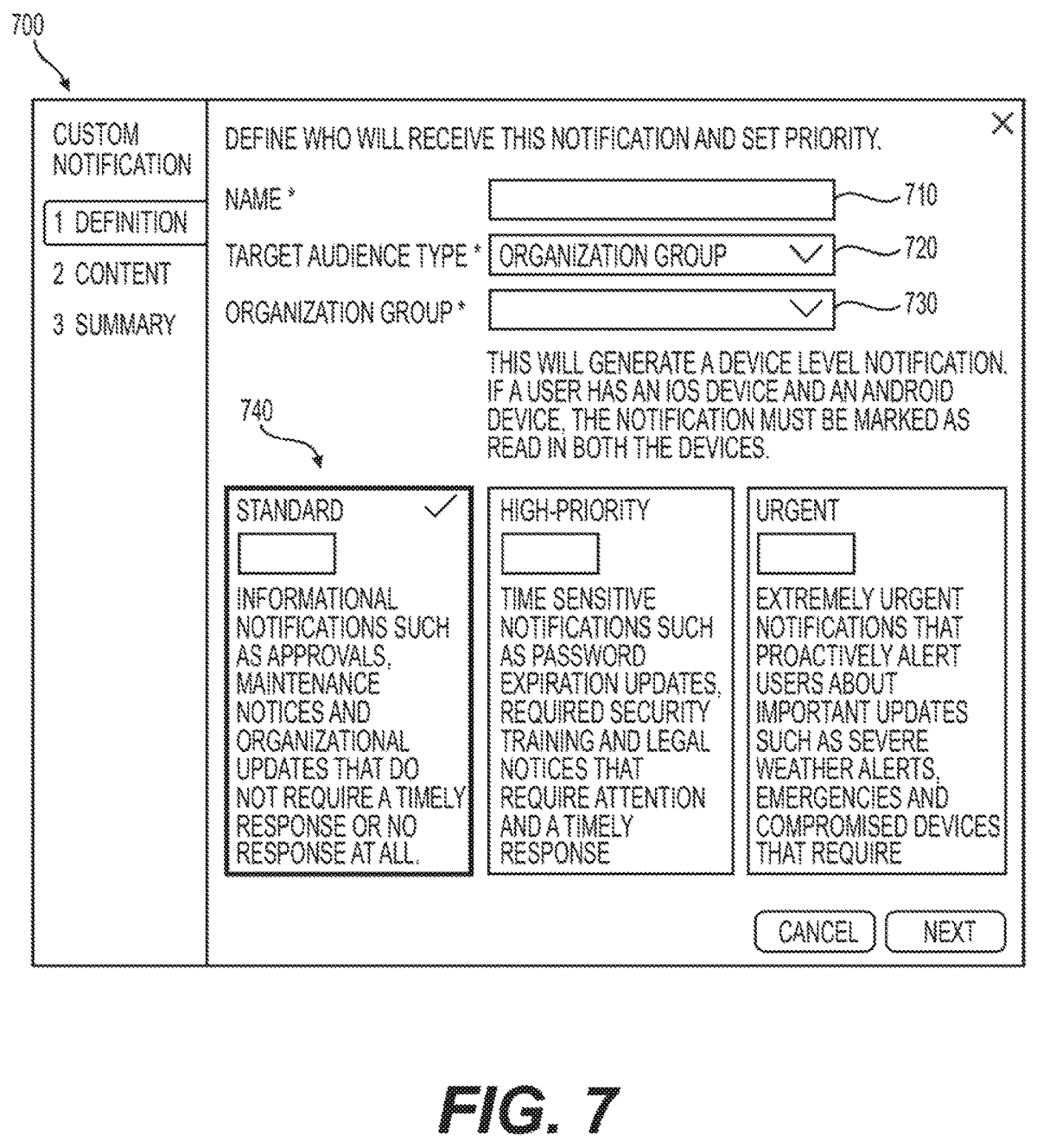
Figure 8:
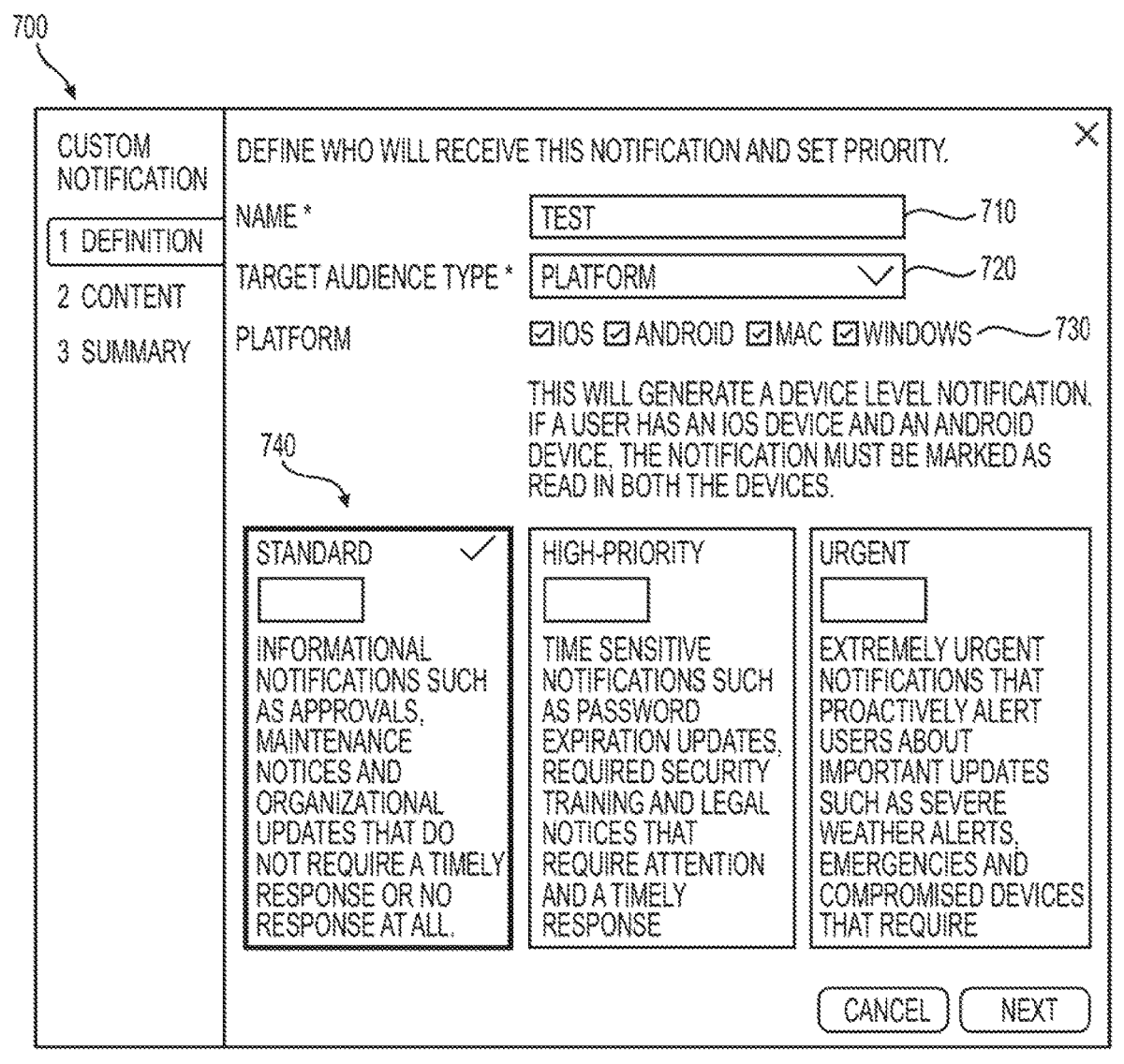

FIGS. 6-8 illustrate a "Definition" page of a notification building process that sets up parameters of a notification. In particular, FIG. 6 illustrates a notification management page 610 that allows a user to manage notifications and access a notification builder 700 illustrated in FIG. 7. The notification management page 610 includes a selectable button 620 that can launch the notification builder 700, where an administrator can build a custom notification. An area below the selectable button 620 includes a list of custom notifications 630 that have been built, and details about the notifications, such as the name, status, template, creation date, and groups or individuals to which the notification applies.

As shown in FIG. 7, the exemplary GUI component providing the notification builder 700 can include a name field 710 to enter a name of the notification. It can also include a target audience group field 720 where an administrator can select a type of audience for the notification, such as an organization group. An organization group notification can apply to all users within a selected organization. Selecting "Organization Group" can cause the notification builder 700 to display a sub-target audience field 730 that allows the administrator to select a particular organization group. In an example, the administrator can select multiple organization groups. Other target audience types can be selectable, and any further sub-target audience selections can depend on the type of audience selected. In an example, a target audience type can be a user, which can allow the administrator to select or search for a specific user in a sub-target audience field 730. The notification builder 700 can also include a priority selection 740 that can include Standard, High-Priority, and Urgent, for example. The priority of the notification can affect how the notification is presented to a user.

FIG. 8 illustrates another example of the notification builder 700 where "platform" is selected in the target audience group field 720. A platform may be specified for the target audience group field as shown, and can indicate an operating system of a user device. Selecting the platform option can cause the notification builder 700 to display options for different operating systems running on user devices. For example, as shown in FIG. 8, the notification builder 700 provides options to select IOS, Android, Mac, and Windows in the sub-target audience field 730. An administrator can select OS platforms to which the notification may apply. Examples of other target audience types can include "All Devices," "All Employees," "User Group," and "Smart Group."

Figure 9:
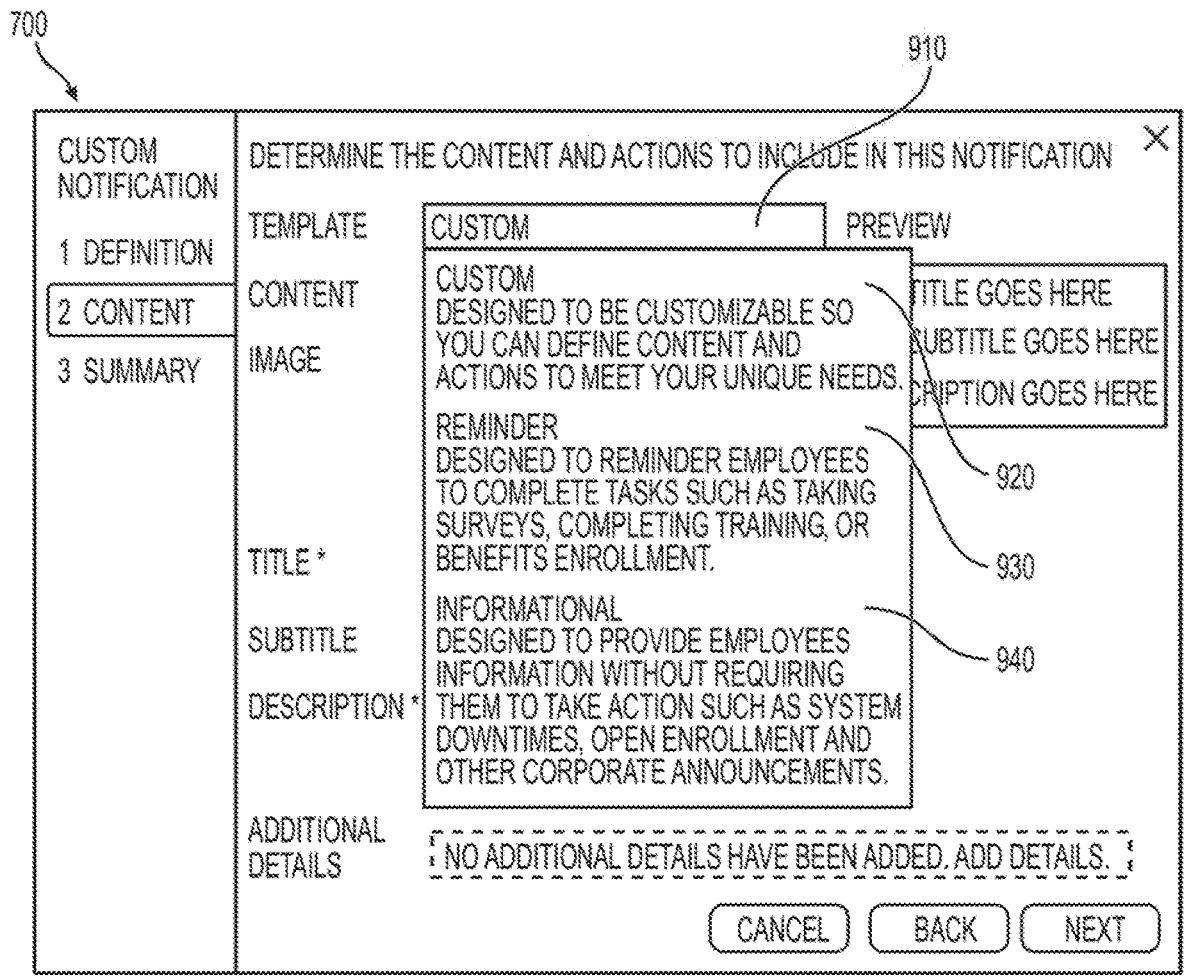
FIG. 9 illustrates an exemplary GUI component for providing a notification builder.

FIGS. 9-15 illustrate an exemplary GUI component and example GUI screens for a "Content" page of the notification builder 700. In one example, these "content" pages can be used to set up content that will be provided in a notification. FIG. 9 illustrates an example content page that includes a "Template" selection 910 where an administrator can select from a list of predefined templates. For example, the template selection 910 can include "Custom" 920, "Reminder" 930, and "Informational" 940 templates. In FIG. 9, Reminder 930 and Information 940 templates are predefined templates where an administrator can only build a notification from predefined fields. The Reminder template 930 can remind users to complete tasks such as taking surveys, completing training, or benefits enrollment. The Informational template 940 can provide users with certain information without requiring them to act. For example, informational notifications can provide information about system downtimes, open enrollment, and other organizational announcements. The Custom template 920 can provide a template option that allows an administrator to add and customize fields in a notification. For example, an administrator can define content and actions based on unique needs.

A template selected from template selection 910 can determine which fields are available on a content page. For example, FIG. 10 illustrates examples of available fields for the Informational template 940. The exemplary fields can include "Image" 1010, "Title" 1020, "Subtitle" 1030, and "Description" 1040 fields. The content page can include preview area 1050 that shows how a notification will appear on user devices. As shown in FIG. 10, a title "Upcoming System Downtime" appears at the top of a notification card in the preview area 1050. In addition, a subtitle "coming this Sunday" appears below the detail. Content provided in the Description field 1040 appears in a "Description goes here" area of the notification card.

FIG. 11 illustrates an exemplary summary page of the notification builder 700. This page can provide information from a definition and content pages about a notification. The summary page can also include a preview 1110 of the notification card. A selectable button 1120 can be included that when selected, finishes a notification build process by generating a notification that has been built and sending it to target users.

Figure 12:
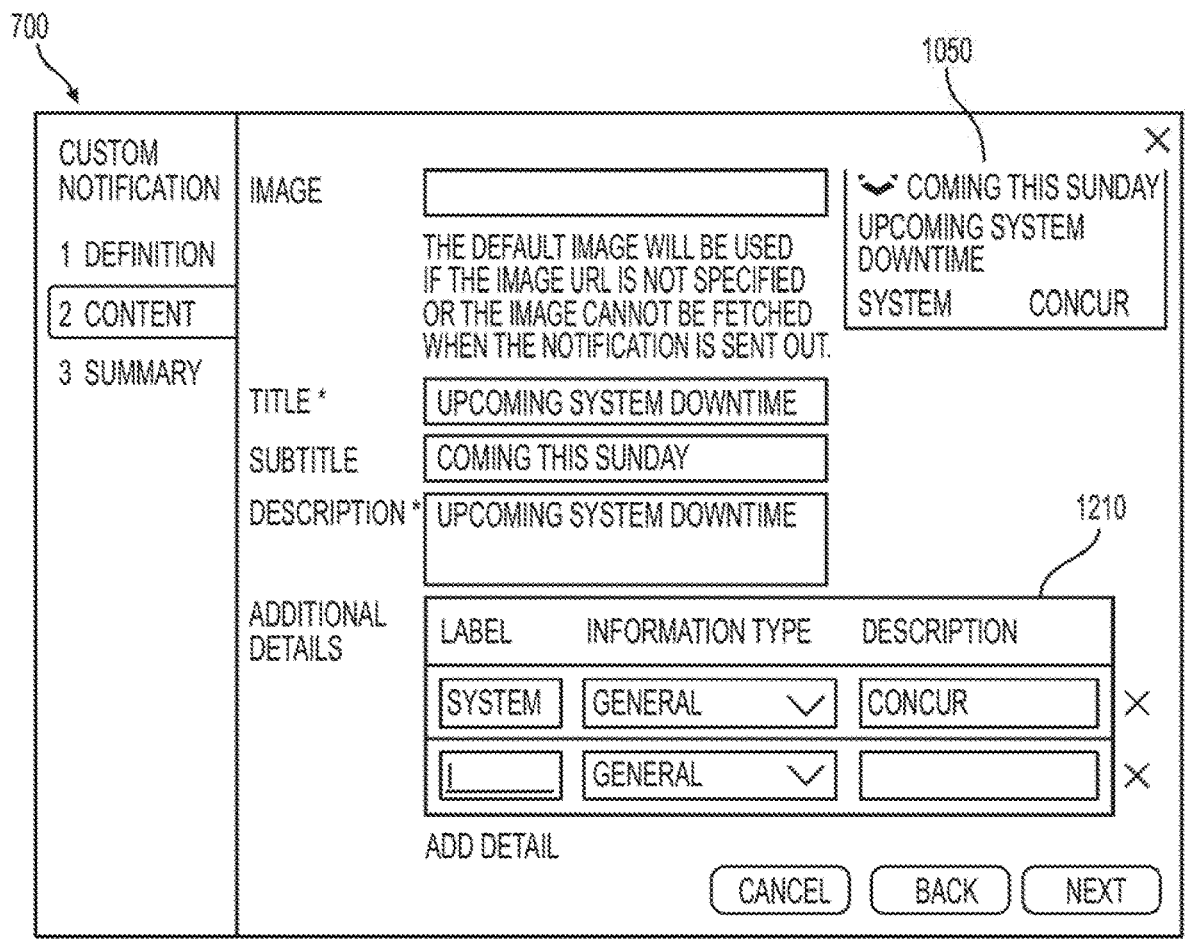
FIG. 12 illustrates an exemplary GUI component for providing a notification builder.

FIG. 12 illustrates additional fields that can be available for customization when the Custom template 920 option is selected. For example, the Custom template 920 can include options to add additional details 1210. The additional details 1210 can appear in the notification card. For example, a label ("system") and a description ("concur") appear in the notification card preview 1050 area below the text from Description field 1040.

Figure 13:
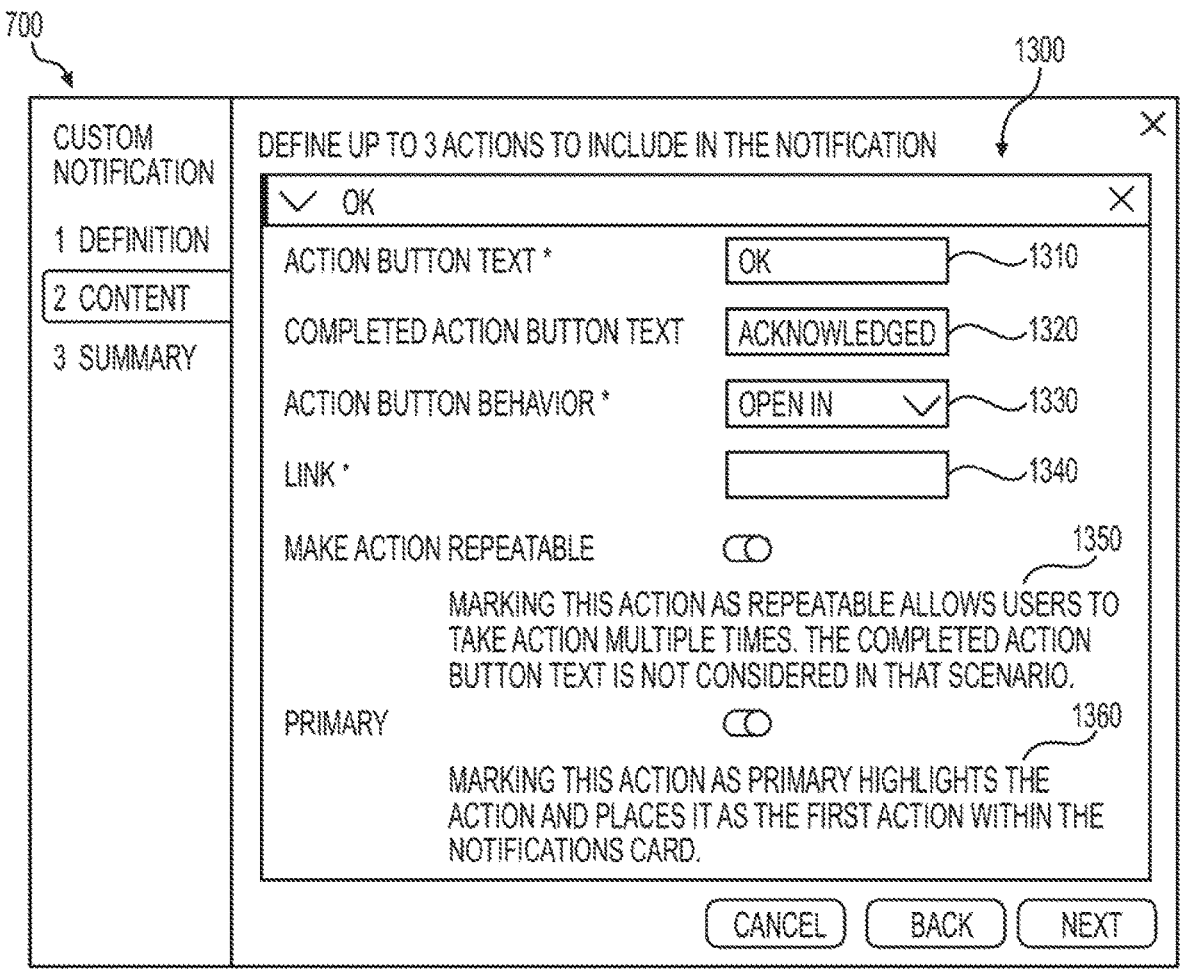
FIG. 13 illustrates an exemplary GUI component for providing a notification builder.

FIG. 13 illustrates an action builder 1300 that can be included in the Custom template 920. The action builder 1300 can allow an administrator to create action buttons in a notification based on parameters that can be customized in a notification build process. Some examples of parameters that can be customized include an action button text 1310, a completed action button text 1320, an action button behavior 1330, a link field 1340, an option to make an action repeatable 1350, and an option to place a button near a top of a notification card 1360.

Figure 14:
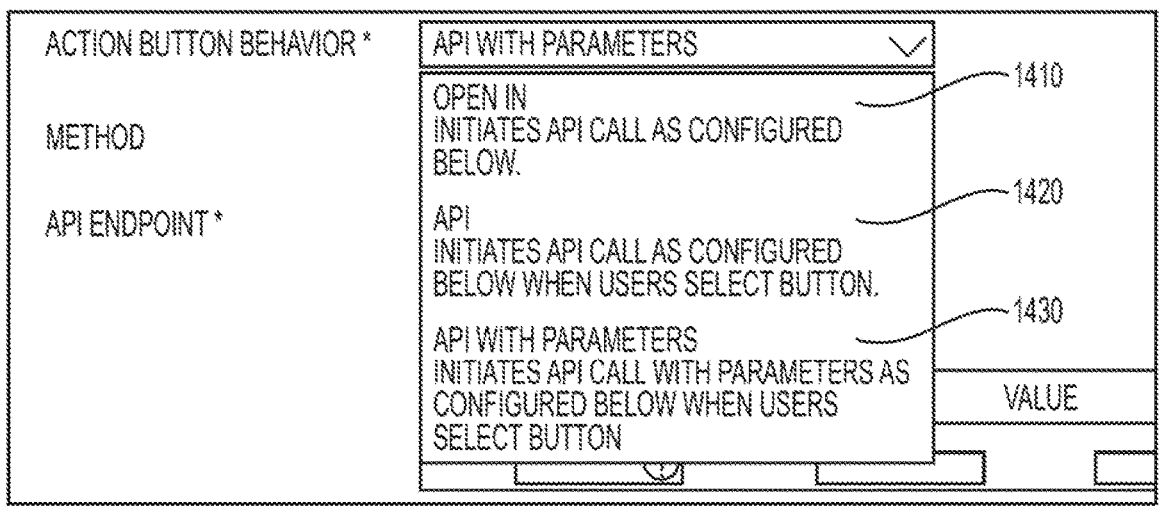
FIG. 14 illustrates an exemplary GUI component for providing a notification builder.

FIG. 14 illustrates an example options that can be selected for the action button behavior 1330. In one example, options that can be selected for an action button behavior can be designated as "Open In" 1410, "API" 1420, and "API with Parameters" 1430. In one example, an action button behavior for a user selection of an action button configured according to the Open In 1410 option can result in a generation of a new field, such as link field 1340 in FIG. 13, that allows an administrator to provide a link, or URL, to direct the user to a web page upon the user's selection of the action button. An action button behavior for the API 1420 option can include an initiation of an API call with default configuration parameters when a user selects a button. In another example, an action button behavior for the API with Parameters 1430 option can include an initiation of an API call with custom configuration parameters.

Figure 15:
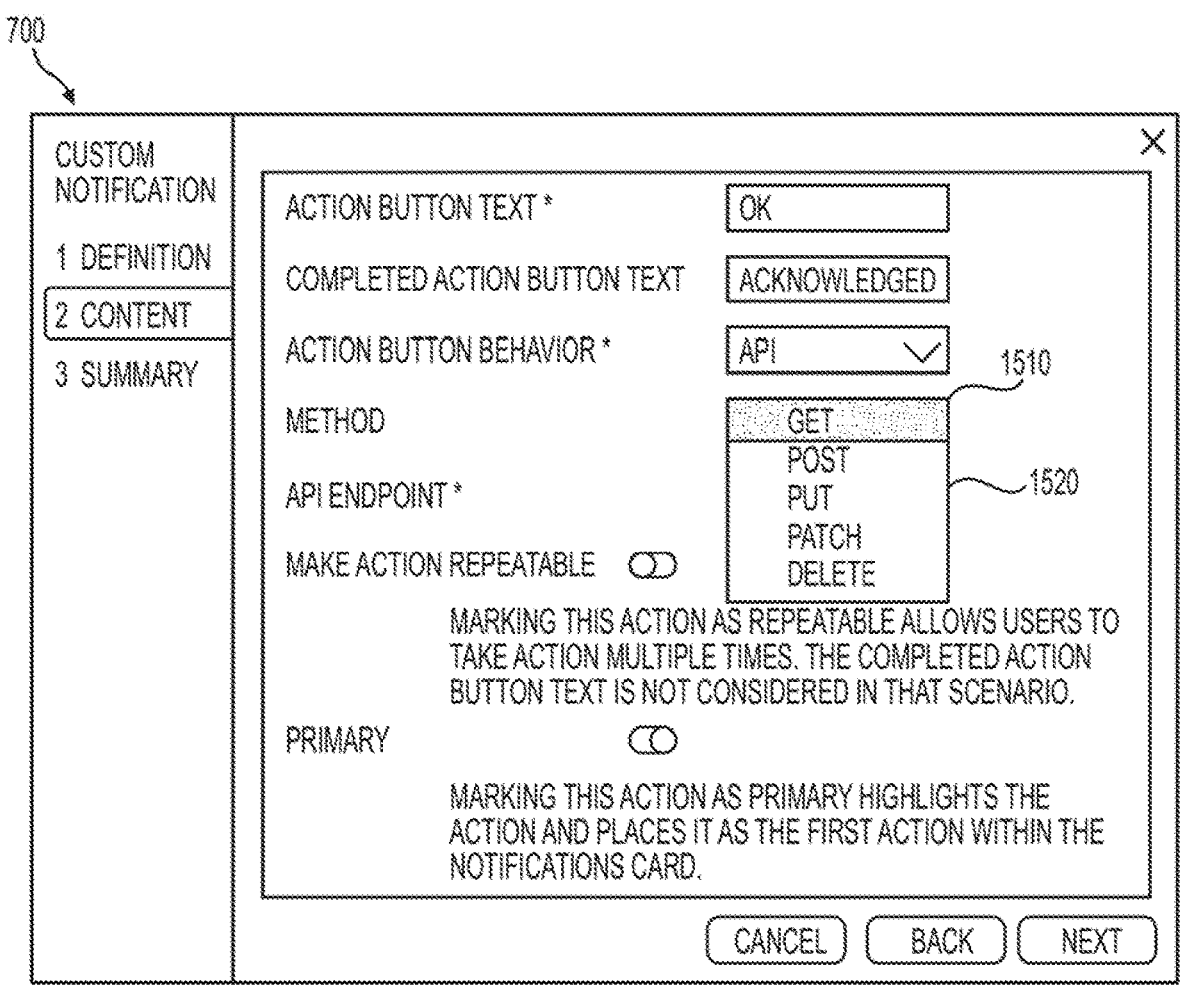
FIG. 15 illustrates an exemplary GUI component for providing a notification builder.

FIG. 15 illustrates options that can be provided when the API 1420 option is selected during the build process. The notification builder 700 can provide options to select an operation or method 1510 ("method 1510") and an API Endpoint 1520. Example method types can include GET, POST, PUT, PATCH, and DELETE. Selecting the API with Parameters 1430 option can display parameter options that can be configured as part of the build process. For example, the API with Parameters 1430 option can also provide input fields or preferred values.

Figure 16:
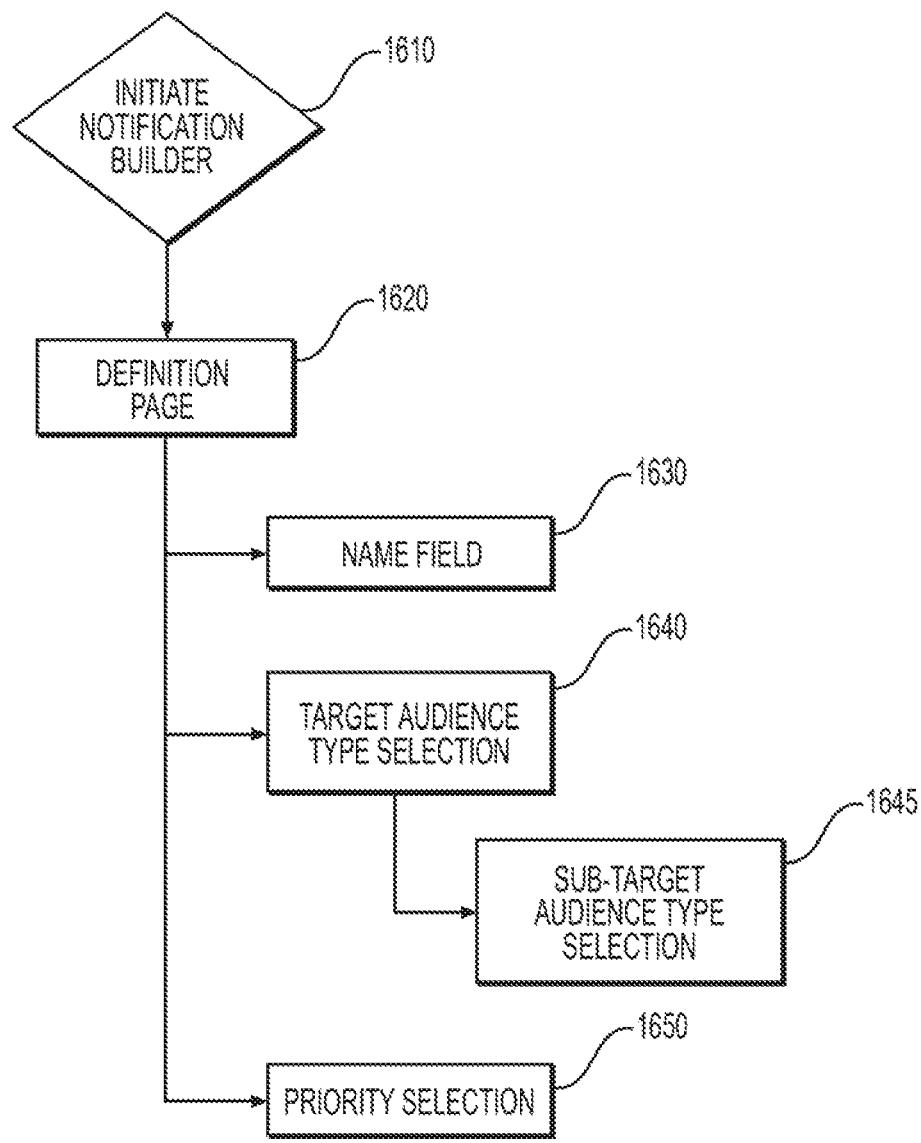
FIG. 16 is a flowchart for representing an exemplary operation flow associated with a build process implemented using a notification builder.
Figure 17:
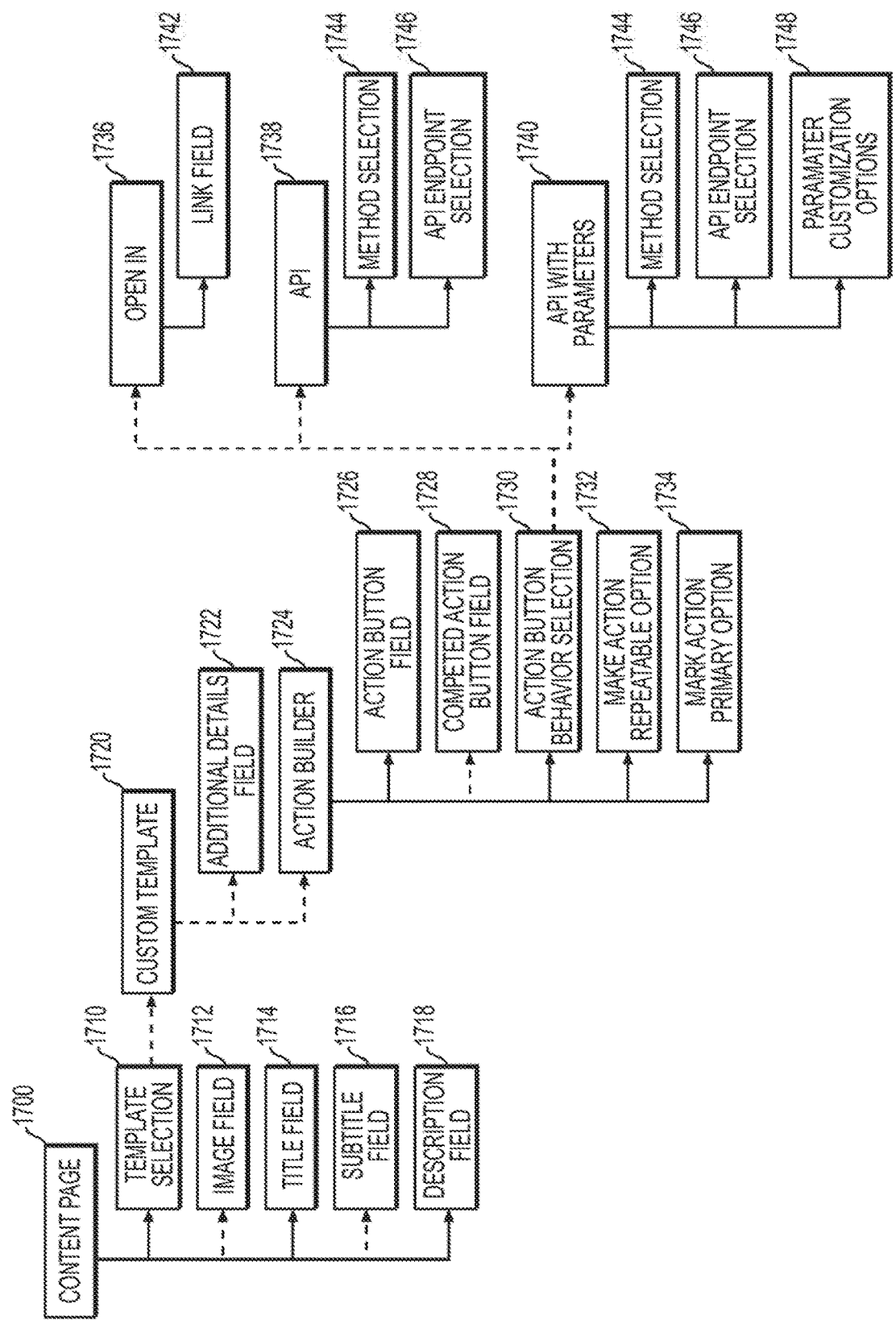
FIG. 17 is a flowchart for representing an exemplary operation flow associated with a build process implemented using a notification builder.

FIGS. 16-17 are flow charts representing an exemplary operation flows associated with a build process implemented through the notification builder 700 with regards to a Definition page and Content page respectively. In FIGS. 16-17, solid lines can represent elements that an administrator is required to complete, and dotted lines can be optional. The requirement settings for elements can be set by an administrator, as an example.

FIG. 16 is a flow chart representing an exemplary operation flow associated with a build process directed toward an example definition page. At stage 1610, an administrator initiates the notification builder 700. As an example, a user can select the selectable button 620 from FIG. 6 and cause the notification builder 700 to launch. At stage 1620, the notification builder 700 can display the Definition page. The Definition page can initially display several elements such as a name field 1630, a target audience type selection 1640, and a priority selection 1650. Field elements, like the name field 1630, can be entry fields where the administrator can enter alphanumeric text, for example. Selection elements, like the target audience type selection 1640 and the priority selection 1650, can be drop-down menus or other selection tools with predetermined options. After the administrator chooses the target audience type selection 1640, the notification builder 700 can display a sub-target audience type selection 1645 element. The available options for the sub-target audience type selection 1645 can depend on the target audience type selection chosen by the administrator.

FIG. 17 is a flow chart representing an exemplary operation flow associated with a build process directed toward an example Content page 1700. The Content page 1700 can initially display content elements like a template selection 1710, an image field 1712, a title field 1714, a subtitle field 1716, and a description field 1718. In FIG. 17, the image field 1712 and the subtitle field 1716 are optional elements that an administrator may not be required to complete. The notification builder 700 can display other elements depending on a template selected. For example, in FIG. 17, the custom template 1720 is optionally selected. Selection of the custom template 1720 can cause the notification builder 700 to display an additional details field 1722 and an action builder 1724.

Selecting the action builder 1724 can cause other elements to appear that provide options for building an action button. Action button elements can include an action button field 1726, a completed action button field 1728, an action button behavior selection 1730, a make action repeatable option 1732, and a mark action as primary option 1734.

Selectable options for action button behavior can include Open In 1736, API selection 1738, and API with parameters 1740 options. Selecting the Open In 1736 can cause a link field 1742 to appear. The link field 1742 can receive alphanumeric input of a URL, for example. This will cause the action button in the notification to open a webpage associated with the URL when selected. Selecting the API selection 1738 option can cause a method selection 1744 and an API endpoint selection 1746 elements to appear. Selecting the API with parameters 1740 option can cause the method selection 1744 element, the API endpoint selection 1746 element, and parameter customization options 1748 to appear. These elements can allow the administrator to further customize an action button using methods previously described herein.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing a notification system, comprising:
    receiving a first notification from a first application, wherein the first notification includes a first priority, wherein the first application is managed by a system that manages user devices, and wherein the system is an Enterprise Mobility Management system;
    receiving a second notification from a second application, wherein the second notification includes a second priority, and wherein the second application is not managed by the system;
    based on the first application being managed by the system, applying a first threshold priority to the first notification;
    in an instance where the first priority is above the first threshold priority, transmitting the first notification to a user device;
    based on the second application not being managed by the system applying a second threshold priority to the second notification; and
    in an instance where the second priority is below the second threshold priority, blocking the second notification from being sent to the user device.

2. The method of claim 1, wherein the first threshold priority is lower than the second threshold priority.

3. The method of claim 1, further comprising retrieving a notification rule for a tenant associated with the first and second notifications.

4. The method of claim 1, wherein the first threshold priority is a priority for managed user devices.

5. The method of claim 1, wherein the second threshold priority is a priority for unmanaged user devices.

6. The method of claim 1, further comprising:
    based on the first priority being above a third threshold priority, transmitting instructions to the user device to display the first notification on top of a graphical user interface ("GUI"); and
    transmitting instructions to the user device to require user interaction with the first notification before allowing access to the GUI.

7. A non-transitory, computer-readable medium containing instructions that, when executed by a hardware-based processor, performs stages for providing a notification system, the stages comprising:
    receiving a first notification from a first application, wherein the first application is managed by a system that manages user devices, and wherein the system is an Enterprise Mobility Management system;
    receiving a second notification from a second application, wherein the second application is not managed by the system;
    based on the first application being managed by the system, applying a first threshold priority to the first notification;
    in an instance where the first priority is above the first threshold priority, transmitting the first notification to a user device;
    based on the second application not being managed by the system applying a second threshold priority to the second notification; and
    in an instance where the second priority is below the second threshold priority, blocking the second notification from being sent to the user device.

8. The non-transitory, computer-readable medium of claim 7, wherein the first threshold priority is lower than the second threshold priority.

9. The non-transitory, computer-readable medium of claim 7, further comprising retrieving a notification rule for a tenant associated with the first and second notifications.

10. The non-transitory, computer-readable medium of claim 7, wherein the first threshold priority is a priority for managed user devices.

11. The non-transitory, computer-readable medium of claim 7, wherein the second threshold priority is a priority for unmanaged user devices.

12. The non-transitory, computer-readable medium of claim 7, the stages further comprising:

based on the first priority being above a third threshold priority, transmitting instructions to the user device to display the first notification on top of a graphical user interface ("GUI"); and transmitting instructions to the user device to require user interaction with the first notification before allowing access to the GUI.

13. A system for providing a notification system, comprising:

a memory storage including a non-transitory, computer-readable medium comprising instructions; and a computing device including a hardware-based processor that executes the instructions to carry out stages comprising:

receiving a first notification from a first application, wherein the first notification includes a first priority, wherein the first application is managed by a system that manages user devices, and wherein the system is an Enterprise Mobility Management system;

receiving a second notification from a second application, wherein the second notification includes a second priority, and wherein the second application is not managed by the system;

based on the first application being managed by the system, applying a first threshold priority to the first notification;

in an instance where the first priority is above the first threshold priority, transmitting the first notification to a user device;

based on the second application not being managed by the system, applying a second threshold priority to the second notification; and in an instance where the second priority is below the second threshold priority, blocking the second notification from being sent to the user device.

14. The system of claim 13, wherein the first threshold priority is lower than the second threshold priority.

15. The system of claim 14, wherein the second notification is blocked based also on the second priority being below a threshold priority for unmanaged user devices.

16. The system of claim 13, further comprising retrieving a notification rule for a tenant associated with the first and second notifications.

17. The system of claim 13, the stages further comprising:

based on the first priority being above a third threshold priority, transmitting instructions to the user device to display the first notification on top of a graphical user interface ("GUI"); and transmitting instructions to the user device to require user interaction with the first notification before allowing access to the GUI.

* * * * *